United States Patent [19]

Tobey

[11] 3,747,865

[45] July 24, 1973

[54] WEB PROCESSING CARTRIDGES

[75] Inventor: Frederic Samuel Tobey, Hyde Park, Mass.

[73] Assignee: W. H. Brady Co., Milwaukee, Wis.

[22] Filed: Mar. 10, 1971

[21] Appl. No.: 122,929

[52] U.S. Cl. ............ 242/55.53, 242/71.1, 242/71.9, 242/197

[51] Int. Cl. ............................................ B65d 85/67

[58] Field of Search .................... 242/68.3, 71.1, 76, 242/71.9, 73, 197; 352/72, 78

[56] References Cited

UNITED STATES PATENTS

| | | | |
|---|---|---|---|
| 3,159,357 | 12/1964 | Berlings | 242/71.1 |
| 3,408,019 | 10/1968 | Wells | 242/71.1 |
| 3,411,734 | 11/1968 | Greenberg et al. | 242/71.9 |

*Primary Examiner*—George F. Mautz
*Attorney*—Wm. W. Rymer

[57] ABSTRACT

Tape processor and a plurality of tape cartridges; the processor having a cartridge mount including a cartridge locating portion, and a tape drive for advancing tape out of the cartridge along a direction; each cartridge having a supply of tape, a tape guide having a midline and a width about the midline corresponding to the width of the tape, and means for cooperating with the cartridge locating portion when the cartridge is mounted in the processor, thereby to locate the midline of the tape guide in a predetermined position along a line transverse to the tape direction; at least two of the cartridges having tape guides of different widths, the predetermined position being the same for each of the two cartridges.

5 Claims, 3 Drawing Figures

WEB PROCESSING CARTRIDGES

BACKGROUND OF THE INVENTION

This invention relates to feeding tape from a tape cartridge along a direction accurately fixed by a guide, e.g. in a label maker.

Frequently it is desired to change the width of the tape and nevertheless have it guided without change in the location of the tape center line.

SUMMARY OF THE INVENTION

In general the invention features a tape processor and a plurality of tape cartridges; the processor having a cartridge mount including a cartridge locating portion, and a tape drive for advancing tape out of the cartridge along a direction; each cartridge having a supply of tape, a tape guide having a midline and a width about the midline corresponding to the width of the tape, and means for cooperating with the cartridge locating portion when the cartridge is mounted in the processor, thereby to locate the midline of the tape guide in a predetermined position along a line transverse to the tape direction; at least two of the cartridges having tape guides of different widths, the predetermined position being the same for each of the two cartridges. In preferred embodiments each cartridge has at least three exterior lugs protruding from its side wall a distance dependent upon the width of the guide, the sum of half the guide width and the lug length being invariant from cartridge to cartridge, the lugs being spaced angularly about an opening in the cartridge which receives a mounting post carried by a bracket in the processor; and the tape guide has an opening through which a tape drive operates by pressing the tape against a low friction back-up tab opposite the opening.

The invention thus provides a simple, inexpensive and foolproof way of feeding tapes of different widths in a single processor, no adjustments being required upon change of width. The low friction tab allows the tape drive to be located close to the imaging station.

Other features and advantages of the invention will be apparent from the following description of a preferred embodiment thereof, taken together with the drawings.

DESCRIPTION OF THE PREFERRED EMBODIMENT

Figures 1, 2, 3:
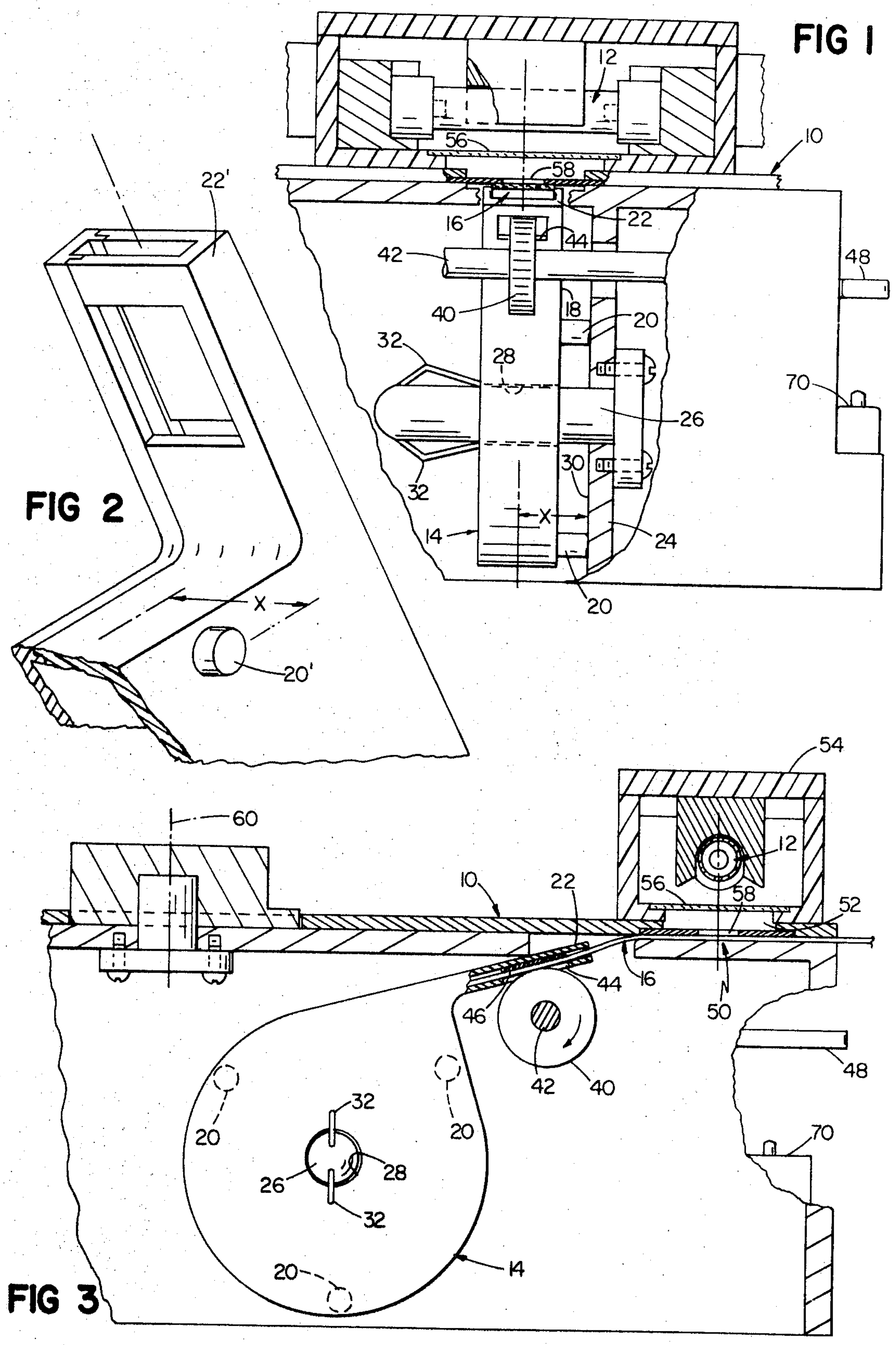
FIG. 1 is a vertical sectional view of a fragment of the processor.
FIG. 2 is an enlargement of a fragment of a tape cartridge of width different from that shown in FIG. 1.
FIG. 3 is a sectional view taken at 90° to the section of FIG. 1.

Referring to the drawings, label making apparatus is shown in which a circular master stencil 10 is mounted between xenon arc flashtube 12 and cartridge 14 of ultraviolet imaging tape 16 (coated with a material sold by E. I. duPont de Nemours under the trade designation "Dylux"). The cartridge is of opaque plastic, has a side wall 18 from which protrude three identical exterior lugs 20, and has a tape guide 22 of inside width barely larger than the width of the tape. Secured to mounting bracket 24 is a post 26 which fits through opening 28 to support the cartridge with lugs 20 against bracket wall surface 30. The lugs are equally spaced angularly about opening 28 to vertically orient the cartridge, and are kept in contact with surface 20 by springs 32 on post 26.

Knurled tape indexing wheel 40 is carried by shaft 42 and presses against tape 16 through opening 44 in guide 22. A back-up tab 46 of Teflon is fixed to the inner guide surface opposite opening 44, to allow tape 16 to slide smoothly through the guide as wheel 40 rotates. Finger operated lever 48 is provided to rotate shaft 42 through conventional linkage (not shown).

Tape 16 extends from guide 22 to an imaging station 50 beneath aperture 52 at the bottom of flashtube housing 54. Filter 56 covers aperture 52 to screen out all light except that in the ultraviolet frequency range.

Stencil 10 is opaque except for characters (e.g., at 58) arranged along its periphery. The stencil can be rotated about axis 60 to bring a selected character into registry with flashtube 12.

An electrical circuit (shown in detail in a U.S. patent application Ser. No. 122,764 filed Mar. 10, 1971, by Roby B. White and Frederic S. Tobey, entitled "Flashing"), including switch 70 mounted beneath lever 48 of the index mechanism, is arranged to supply to flashtube 12, upon each actuation of switch 70, a rapid series (over a total period of about 400 milliseconds) of 25 electrical pulses each of 1.56 joules energy level (less than 5 percent of explosion energy) and 200 microseconds duration.

The cartridge shown in FIG. 2 is identical to that of FIGS. 1 and 3 except that guide 22′ is wider than guide 22 (to accommodate a wider tape, omitted from FIG. 2), and lugs 20′ are correspondingly shorter, so that the distance X between the ends of the lugs and the centerline of the tape guide is the same for all cartridges.

In use, a cartridge with tape of the desired width is loaded on post 26. With lugs 20 or 20′ against surface 30, the centerline of guide 22 or 22′ and hence the centerline of the tape, will be centered under aperture 52, whatever the width of the tape. To make a label, stencil (or imaging master) 10 is rotated to bring the desired character to imaging station 50, and lever 48 is depressed to close switch 70, causing flashtube 12 to flash 25 times as the 25 pulses described above are delivered. After exposure, lever 48 is released, rotating wheel 40 to advance tape 16. (Or, the tape can be advanced prior to imaging.) Successive characters are similarly imaged on the tape. Upon exposure to visible light the images on the tape become photographically fixed.

The low energy level (relative to explosion energy) pulsing of the tube prevents crazing, or extreme darkening of the flashtube envelope, or pressure loss, over a tube life of often millions of flashes, even though the total energy supplied in the series of flashes which make up each character exposure equals a large fraction of explosion energy and the flashes follow each other so rapidly that most of the heat generated by each flash is still present in the tube when the succeeding flash occurs. At the same time, the total energy level of each character exposure is sufficient to give a dark image.

Image darkness can be controlled by varying the number of flashes per exposure.

Subject matter disclosed herein relating to the use of a series of low energy level flashes for each character exposure was the joint invention of Roby B. White and Frederic S. Tobey as disclosed in Ser. No. 122,764.

Other embodiments are within the following claims.

What is claimed is:

1. In a web processing system of the class in which web supply cartridges are adapted to be mounted one by one for delivery of web therefrom in a longitudinal direction to a processing station and in which means for mounting said cartridges includes a first fixed surface abuttingly cooperating with said cartridges to limit transverse movement thereof, the combination with said means for mounting said cartridges of a first cartridge and a second cartridge, said first cartridge including first web width locating means for locating a web of a first width transversely relative to said first cartridge and a second fixed permanent surface positioned on one transverse side of said first cartridge, said second cartridge including second web width locating means for locating a web of a second width transversely relative to said second cartridge and a third fixed permanent surface positioned on one transverse side of said second cartridge, said transverse sides being correspondingly located toward said first fixed surface, and said first width being unequal to said second width, the transverse distance from said second fixed permanent surface to the centerline as defined for said first web by said first web width locating means being the same as the transverse distance from said third fixed permanent surface to the centerline as defined for said second web by said second web width locating means, whereby said cartridges may be simply and reliably interchanged without changing web centerline alignment although web width is different and transverse positioning is by abutment on one transverse side of web centerline only.

2. The combination of claim 1 in which said second fixed permanent surface and said third fixed permanent surface are carried by lugs protruding from corresponding side walls of said first cartridge and said second cartridge.

3. The combination of claim 2 in which each said cartridge carries three angularly spaced said lugs.

4. The combination of claim 1 wherein each said cartridge is provided with a central opening adapted to cooperate with a post extending away from said first fixed surface for mounting said cartridge thereon and with the said fixed permanent surface thereof against said first fixed surface.

5. The combination of claim 1 in which each said web width locating means includes a wall with an opening to admit a web drive, a low friction back-up tab being positioned in said web width locating means opposite said opening, whereby webs slide easily along said tab upon actuation of said drive.

* * * * *